Figure 1:
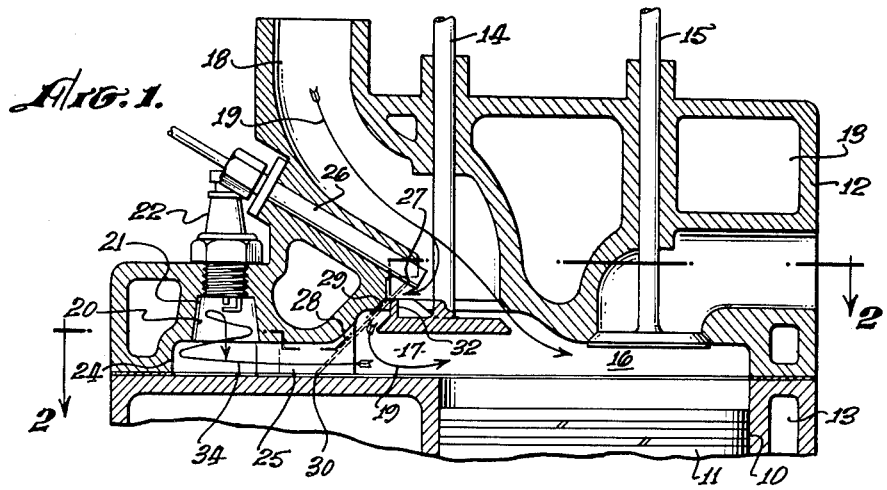

June 14, 1966  E. A. VON SEGGERN ET AL  3,255,739
EXCESS AIR CYCLE ENGINE
Original Filed May 6, 1963

ERNEST A. VON SEGGERN,
HENRY F. VON SEGGERN,
INVENTORS.

BY
ATTORNEY.

3,255,739
EXCESS AIR CYCLE ENGINE
Ernest A. von Seggern, 1051 E. Angeleno, Burbank, Calif., and Henry E. von Seggern, Rte. 2, Box 1910, Escondido, Calif.
Original application May 6, 1963, Ser. No. 278,383. Divided and this application Aug. 16, 1965, Ser. No. 479,780
7 Claims. (Cl. 123—32)

This application is a division of our copending application, Serial No. 278,383, filed May 6, 1963, for Excess Air Cycle Engine.

This invention relates to a combustion chamber for internal combustion engines, and in particular to a chamber which is designed to operate with excess air during part load operation. Fuels such as gasoline or light distillates are suitable for use. The chamber described herein is a special version of the more general type of excess air combustion chambers described in U.S. Patent Nos. 2,808,036 and 2,808,037, which are suitable for both light and heavy fuel.

It is a general object of the invention to provide a combustion chamber of the type described in which light fuel is burned in the presence of excess air at part load and a clean, odorless, non-smog producing combustion is obtained. Another object is to provide a combustion chamber in which high thermal efficiency, especially at part load operation, is obtained.

Other more specific objects include the provision of a combustion chamber to which liquid fuel is supplied with a simple, low pressure, non-atomizing fuel injection system prior to the compression and combustion cycle, and with non-critical timing relative to the engine cycle. Also the provision of a combustion chamber which operates at all times on a full unthrottle air charge, utilizes a conventional spark ignition system, and may be operated over a wide range of compression ratios and engine speeds with high specific output while using relatively low octane fuel.

Other general objects and features of the invention as well as special objects and features will be described in the specification in conjunction with the description of the specific forms shown herein.

The combustion chamber by means of which the foregoing objects are attained makes use of an ignition flame induced combustion of a fuel-air mixture of variable fuel-air ratio, in which the ignition flame is obtained from a fuel-air mixture of substantially stoichiometric proportions and fixed size. The chamber to be described is also characterized by the use of the basic principle on which the engines described in U.S. Patent Nos. 2,808,036 and 2,808,037 operate. This is the method of producing an ignition flame of fixed size by injecting a fixed quantity of fuel into an ignition chamber of fixed and appropriate size such that when a full unthrottled charge of air is compressed into said ignition chamber a stoichiometric fuel-air mixture is formed in said chamber. Furthermore, the fuel-air mixture is maintained completely independent of any fuel in the remainder of the combustion chamber by means of a body of air which is interposed between said mixture and said other fuel during the compression cycle while said mixture is being formed. This method makes possible the use of early fuel injection well in advance of the compression cycle, to provide the time for proper fuel preparation which is one of the essential elements for obtaining clean, smog-free combustion.

Figure 2:
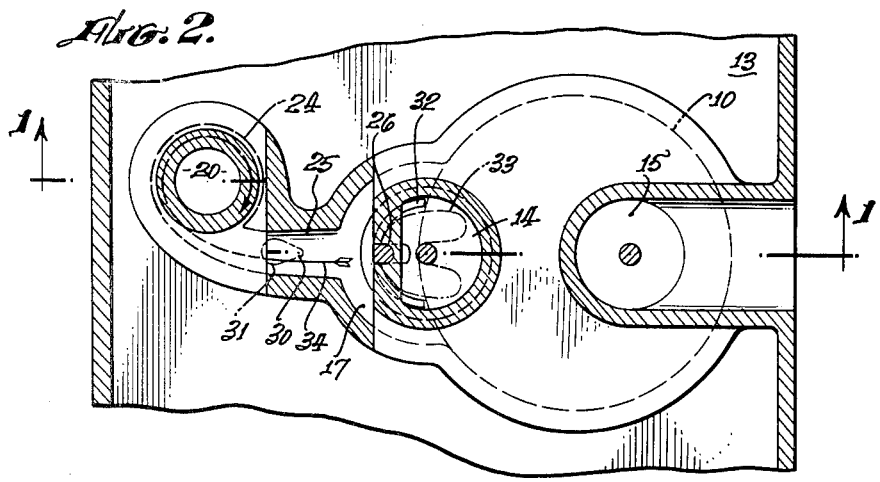

Additional features of the combustion chamber will be described in conjunction with a description of the engine and its modes of operation. In the accompanying drawing, showing typical illustrative embodiments of the broad invention:

FIG. 1 is a vertical section of the engine taken along the broken line 1—1 of FIG. 2; and FIG. 2 is a horizontal section of the engine taken along the broken line 2—2 of FIG. 1.

The combustion chamber will be described as it is incorporated in a conventional four cycle, water-cooled engine, but it is evident that air cooling or other forms of cooling may be employed and that the principles could also be adapted to two cycle forms. In FIGS. 1 and 2 a cylinder 10 with reciprocating piston 11 therein has a cylinder head 12 fastened onto the upper end, and both cylinder head 12 and cylinder 10 are water cooled by means of jacket 13. An inlet valve 14 and an exhaust valve 15 are located in head 12 and above said cylinder and are operated in the conventional manner by the usual mechanism (not shown).

Formed within head 12 is the main combustion chamber 16 which has a pocket 17 partially offset from said cylinder as shown in FIG. 1. The inlet valve opens directly above the cylinder 10. An intake manifold 18 is provided which is arranged to direct air entering the cylinder 10 during the intake stroke of the engine to flow in a line 19 which branches with some air entering said cylinder directly and some entering pocket 17 in a direction generally away from the central axis of cylinder 10 and then turning in a U back towards the cylinder and entering said cylinder as shown.

An ignition chamber 20 which consists of a small generally conical cavity 21 is located in said cylinder head 12 near said pocket 17 and has a spark plug 22 located substantially on the length axis of said conical cavity. An annular groove 24 of diameter somewhat larger than that of the cylindrical cavity is formed at the end of said ignition chamber opposite said spark plug, and a passage 25 joins said annular groove tangentially substantially in the plane of said groove, and also joins said pocket 17. The spark plug 22 may be located on the other end of said ignition chamber adjacent the annular groove, but still on the central axis of cavity 21 if desired.

Passage 25 is oriented such that its length axis, if extended, would intercept the edge of valve 14 at a point most remote from said cylinder 10 and pass substantially through the center of said pocket and on into cylinder 10.

A non-atomizing type of fuel injector 26 is provided and extends into intake passage 18 at a point just above intake valve 14. It has an orifice 27 which is designed to direct injected fuel in a stream 28 in a direction such that it will pass through between valve 14 and its seat 29 when said valve is open and pass on into passage 25. The stream impinges at a point 30 and forms a fuel body 31 on a wall of said passage 25. The intake valve 14 is provided with a raised rim 32 which extends along about ⅙ of the periphery of said valve, and is centrally located with respect to said injector. The valve is provided with conventional means (not shown) for maintaining this orientation of said rim. The rim is high enough so that when said valve is closed the rim will intercept the fuel stream and cause it to collect on the valve head behind said rim as shown by the dotted outline 33. When the valve is in its maximum open position, the rim does not intercept the fuel stream, and the fuel then passes through the valve as shown in FIG. 1.

Fuel is supplied to the injector 26 by a fuel pump (not shown) of the type which has a fixed end of injection and a variable beginning. The pump is timed with respect to th engine so that the fixed end of injection occurs at about the mid-point of the intake stroke when the intake valve is in its maximum open position. When the minimum (idle) fuel charge is injected, this takes place while the intake valve is open. At full load, injection begins at about the middle of the exhaust cycle, while between full and idle load, injection begins later but always ends at the same point.

The engine operates as follows: At full load, fuel injection begins when the intake valve is closed, and most of the total charge of fuel is intercepted by rim 32 and collects on the back of the valve head, as indicated by the dotted outline 33 (FIG. 2). As soon as the intake valve begins to open, air flows into cylinder 10 at the beginning of the intake cycle as shown by flow line 19 and this fuel is picked up and carried into said cylinder via the pocket 17. The unvaporized portion is thrown against the walls of said pocket and is vaporized by heat from said pocket walls. As the piston moves down the intake valve opens wider and a point is reached at about ¼ or ⅓ of the intake cycle when the rim no longer intercepts the fuel stream 28 and the fuel is able to flow in a stream directly into passage 25 and impinge at point 30, forming a fuel body indicated by the dotted outline 31. The injector 26 projects into the intake manifold and forms a shield against the full force of the intake air stream so that the injected fuel stream can pass into said passage without being disrupted by the air.

Injection is then terminated by the pump and as air continues to flow into said cylinder any fuel remaining on said valve or in said pocket is vaporized and carried into said cylinder, while the fuel deposited in passage 25, being out of the path of the flowing air, remains in said passage. At the end of the intake cycle the cylinder is filled with a fuel-air mixture of substantially stoichiometric proportions (full load only), the pocket 17 is filled with air only, and a small quantity of fuel is retained in passage 25.

During the compression cycle the piston 11 rises and compresses the air and fuel charge all into the combustion space 16. Compression induces a flow into the ignition chamber 20 and the flow follows the line 34 as shown. The air in pocket 17 being next to passage 25 and lying between said passage and cylinder 10 in which the fuel-air charge is held, is compressed into passage 25 ahead of said fuel-air mixture. The air in pocket 17 acts as a buffer between the ignition chamber and the cylinder and separates the ignition chamber from the fuel in cylinder 10. Flow 34 from pocket 17 consists of air only, and in flowing up passage 25 it vaporizes and carries with it the body of fuel deposited on the wall of said passage during the intake cycle. The air flow in the ignition chamber spirals up the chamber, thence past the spark plug and down the central axis of said chamber as shown. The fuel-air ratio of the mixture formed in the ignition chamber is substantailly stoichiometric and is controlled by varying the quantity of fuel deposited in passage 25 relative to the volume of air compressed into the ignition chamber at the end of the compression stroke. Means for controlling the fuel-air ratio will be described later.

Shortly before top-dead-center the fuel-air mixture in the ignition chamber is ignited by spark plug 22 and the resultant flaming mixture rushes forcefully out through passage 25 and spreads out through pocket 17 and the remainder of the combustion space 16, igniting any fuel that is contained in said air. After the power stroke the products of combustion are exhausted through valve 15 in the usual manner.

At no load operation the force of the ignition flame alone is sufficient to idle the engine. The volume of the ignition chamber is designed so this is correct. In operation a full charge of air is taken in through passage 18 but injection begins only after intake valve 14 is open enough so that rim 32 does not intercept the fuel and all of the charge is deposited in passage 25. Since there is no air movement in passage 25 during the intake cycle the fuel remains undisturbed until the compression cycle, when it is vaporized by stream 34. The same fuel-air mixture is formed in the ignition chamber at idle load as at full load. At variable load, between idle and full load, the ignition chamber charge is always constant while the power of the engine is controlled only by the quantity of fuel that is carried into cylinder 10 by stream 19.

In order to adjust the fuel-air ratio in the ignition chamber for optimum combustion, the time of the end of injection is varied relative to the point at which the rim 32 just fails to intercept the fuel stream 28. Hence, the later in the cycle that fuel injection terminates the greater the quantity of fuel deposited and the "richer" the fuel-air ratio becomes.

It is understood that the invention is not limited to the precise structure shown and described, but also includes such modifications as may be embraced within the scope of the appended claims.

We claim:
1. In an internal combustion engine of the type having a cylinder and piston, a combustion chamber in communication with said cylinder and an ignition chamber separate from but in communication with said combustion chamber, the method of compressing the working fluid in said engine without displacing working fluid from said cylinder into said ignition chamber, which includes as steps:
    providing, prior to compression, a distinct body of working fluid in a zone between said working fluid in said ignition chamber and said working fluid in said cylinder and said combustion chamber; and
    compressing the working fluid in said engine by displacing the working fluid in said cylinder into said combustion chamber, which in turn simultaneously displaces some of said working fluid from said combustion chamber into said zone occupied by said distinct body of working fluid, and this in turn displaces said distinct body of working fluid into said ignition chamber and compresses said working fluid therein.

2. In operation of an internal combustion engine of the type having a cylinder and piston and which utilizes an ignition charge to ignite a power charge, the method of keeping said fuel charges separate prior to ignition, which includes as steps:
    providing a quantity of fuel for an ignition charge;
    providing additional fuel and air in variable proportions to form a power charge;
    providing a body of air substantially without fuel between said fuel for said ignition charge and said power charge to form a buffer zone therebetween;
    holding said body of air and said power charge in substantially non-turbulent relationship; and
    simultaneously compressing said power charge and said body of air without substantial intermixture thereof while mixing said body of air and said fuel to form said ignition charge.

3. In the operation of an internal combustion engine of the type having a combustion chamber and a separate ignition chamber communicating therewith, the method of producing an ignition charge for said ignition chamber and a power charge for said combustion chamber, and maintaining them separate, which includes as steps:
    providing a variable quantity of fuel outside said combustion chamber;
    providing a substantially uniform quantity of fuel substantially inside said ignition chamber;
    directing an air stream into said combustion chamber to transfer said variable quantity of fuel outside of said combustion chamber into said combustion chamber; and
    directing a second air stream between said fuel transferred into said combustion chamber and said fuel substantially in said ignition chamber to maintain said quantities of fuel separate.

4. In the operation of an internal combustion engine of the type which utilizes an ignition charge to fire a power charge, the method of dividing a single charge of liquid fuel of variable size into a fixed and variable portion, which includes as steps:

injecting said fuel charge in a liquid stream having a length proportional to the quantity injected; and intercepting said stream with movable deflection means during said time of injection at a point a fixed distance from one end of said fuel body, to divide said fuel body into a fixed and a variable portion.

5. In an internal combustion engine having a piston and cylinder, the combination of:

a combustion chamber in communication with said cylinder;

a pocket in open communication with said combustion chamber;

an air intake valve opening, at least in part, into said pocket;

an ignition chamber opening into said pocket at a point remote from said cylinder;

fuel injection means for supplying fuel to said ignition chamber;

fuel injection means for supplying fuel to said combustion chamber; and means for supplying air without fuel to said pocket through said intake valve.

6. In an internal combustion engine having a piston and cylinder, the combination of:

a combustion chamber in communication with said cylinder;

an intake valve opening into said combustion chamber;

an ignition chamber opening into said combustion chamber at a point adjacent said valve;

fuel injection means outside said combustion chamber and adjacent said valve adapted to inject a stream of liquid fuel in a direction such that it will pass through said open intake valve and collect in said ignition chamber; and fuel interception means associated with said valve to intercept said fuel stream and divert it away from said ignition chamber except when said valve is substantially open.

7. In an internal combustion engine having a piston and cylinder, the combination of:

a combustion chamber in communication with said cylinder;

an intake valve opening into said combustion chamber;

fuel injection means outside of said combustion chamber and adjacent said valve adapted to inject a stream of liquid fuel in a direction so as to pass through said valve and into said combustion chamber when said valve is open; and a raised rim extending at least partially around said valve in a position to intercept said stream of injected fuel when said valve is at least partially closed and divert said fuel stream to flow in a different direction than that given to said stream of fuel by said injector.

No references cited.

MARK NEWMAN, *Primary Examiner.*